United States Patent
Nam et al.

(10) Patent No.: US 7,724,244 B2
(45) Date of Patent: May 25, 2010

(54) SLIDE-TYPE INPUT DEVICE, PORTABLE DEVICE HAVING THE INPUT DEVICE AND METHOD AND MEDIUM USING THE INPUT DEVICE

(75) Inventors: Dong-kyung Nam, Yongin-si (KR); Yong-beom Lee, Seoul (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 945 days.

(21) Appl. No.: 11/493,562

(22) Filed: Jul. 27, 2006

(65) Prior Publication Data

US 2007/0070054 A1 Mar. 29, 2007

(30) Foreign Application Priority Data

Sep. 29, 2005 (KR) ............... 10-2005-0091365

(51) Int. Cl.
*G06F 3/033* (2006.01)
(52) U.S. Cl. .................. 345/184; 345/156; 345/157
(58) Field of Classification Search .................. None
See application file for complete search history.

(56) References Cited

U.S. PATENT DOCUMENTS

| | | | |
|---|---|---|---|
| 5,506,681 A | * | 4/1996 | Igaki ..................... 356/616 |
| 5,880,411 A | * | 3/1999 | Gillespie et al. ......... 178/18.01 |
| 2001/0038376 A1 | * | 11/2001 | Sato ......................... 345/156 |
| 2004/0119687 A1 | * | 6/2004 | Suzuki et al. ............... 345/156 |
| 2005/0024331 A1 | * | 2/2005 | Berkley et al. ............. 345/161 |
| 2005/0073496 A1 | * | 4/2005 | Moore et al. ................ 345/156 |

FOREIGN PATENT DOCUMENTS

| | | |
|---|---|---|
| JP | 2000-47821 | 2/2000 |
| JP | 2003-22716 | 1/2003 |
| JP | 2003-99189 | 4/2003 |
| JP | 2003-131800 | 5/2003 |
| JP | 2004-62447 | 2/2004 |

* cited by examiner

*Primary Examiner*—Amare Mengistu
*Assistant Examiner*—Antonio Xavier

(57) ABSTRACT

A slide-type input device, a portable device provided with the input device and a method and medium of using the input device, which more freely move a pointer displayed on a screen, and more conveniently and exactly select a specific object, is provided. The slide-type input device includes a slide button movable in a specific direction, a motion control hole providing a movement area of the slide button, a location-detection module detecting location-change information according to the movement of the slide button, and a controller controlling a pointer displayed on the screen based on the location-change information of the slide button, wherein the slide button is moved in the specific direction by an external force applied by a user, and is then returned to an original location by an elastic force when the external force of the user is removed.

26 Claims, 10 Drawing Sheets

SLIDE-TYPE INPUT DEVICE, PORTABLE DEVICE HAVING THE INPUT DEVICE AND METHOD AND MEDIUM USING THE INPUT DEVICE

CROSS-REFERENCE TO RELATED APPLICATIONS

This application claims the benefit of Korean Patent Application No. 10-2005-0091365, filed on Sep. 29, 2005, the disclosure of which is incorporated herein in its entirety by reference.

BACKGROUND OF THE INVENTION

1. Field of the Invention

The present invention relates to a slide-type input device, a portable device provided with the input device, and a method and medium of using the input device, and more particularly to a slide-type input device, a portable device provided with the input device, and a method and medium using the input device, which can move a pointer displayed on a screen and more conveniently and exactly select a specific object.

2. Description of the Related Art

Portable devices such as a cellular phone and a personal digital assistant (PDA) are usually provided with an input device called a pointing device. A user of the portable device can move control objects such as a cursor, a pointer, and others, by operating the pointing device.

In case of the portable devices, a pointing device, which moves the control objects using input keys (direction keys) in the plane of a display screen, has been widely used. The pointing device detects a key input operation by the user, and converts the detected key input operation to a movement control command for controlling so that the control object can be moved in the plane of the display screen.

There has been greatly increased a need to be able to freely move the control objects in any direction, because applications of the portable device perform multiple functions. However, the pointing device using the direction keys has not been designed on the assumption that the control objects are to move freely in any direction. Therefore, the pointing device using the direction keys has a disadvantage in that it is not possible for the control objects to be moved in an arbitrary direction on the display screen.

Pointing devices, by which the control object can be moved in an arbitrary direction on the display screen, include stick type pointing devices such as a joy stick, a touch pad, a track ball, a track pointer, and others.

However, in small and thin portable devices, it is not desirable that the pointing device, in which a lever protrudes from a surface of a cabinet, be built in the portable device, respectively. Further, even if the protruded lever is short, the operation ability of the user is decreased, because the length of the lever is short.

Further, the touch pad has the disadvantage that additional equipment (e.g., a stylus pen) is required. The track ball has the disadvantage in that the portable device becomes larger. In addition, pressure operated track points are inconvenient.

Japan Patent Unexamined Publication No. 2004-062447 discloses a point device of a mobile terminal including a rim having a circular shape, a center key configured to be movable in an arbitrary direction of an xy plane, and Hall elements configured to detect the direction and amount of movement of the center key in the xy plane, which can enable a user to operate in an arbitrary direction (i.e., at an angle of 45 degrees) within the rim using the center key.

However, Japan Patent Unexamined Publication No. 2004-062447 measures a location of the central key on the xy plane by detecting the change of a magnetic flux density using the Hall elements.

SUMMARY OF THE INVENTION

Additional aspects, features, and/or advantages of the invention will be set forth in part in the description which follows and, in part, will be apparent from the description, or may be learned by practice of the invention.

Accordingly, the present invention solves the above-mentioned problems occurring in the prior art, and the present invention allows the user to more freely move a pointer displayed on a screen and more conveniently and exactly select a specific object, using a slide-type input device.

In another aspect of the present invention, there is provided a portable device having a slide button that can move in a specific location and select a specific object.

In an aspect of the present invention, there is provided a slide-type input device, which includes a slide button movable in a specific direction; a motion control hole providing a movement area of the slide button; a location-detection module detecting location information that is changed by the slide button; and a controller controlling a pointer that is displayed on a screen based on location-change information of the slide button, wherein the slide button is moved in a specific direction by an external force produced by a user, and is then returned to an original location due to an elastic force.

In another aspect of the present invention, there is provided a portable device provided with a slide-type input device, which includes an input unit movable in a specific direction by an external force of a user and selecting a specific object; a pointer changing a location depending on a movement direction of the input unit; and a display panel displaying the selected object from the pointer.

In still another aspect of the present invention, there is provided a method for using a slide-type input device; which includes a user moving a slide button in a specific direction; calculating a location and an amount change of the movement of the slide button; moving the pointer based on the calculated location and the amount of change of the movement; and an elastic force returning the slide button to an original location when the external force is removed. There is also provided a medium including computer readable instructions implementing this method.

In still another aspect of the present invention, there is provided a method for using a slide-type input device; which includes when a slide button is moved in a specific direction by an external force of a user, detecting movement location information of the slide button; calculating a movement location of the slide button and whether the slide button is located around a boundary of a motion control hole; calculating an amount of movement change of the slide button depending on whether it is approaches the boundary of the motion control hole in the slide button; calculating a movement location of a pointer that is displayed on a screen based on the calculated location and movement change of the slide button; and displaying the pointer at the calculated movement location. There is also provided a medium including computer readable instructions implementing this method.

In still another aspect of the present invention, there is provided a slide-type input device including a movable slide button; and a location-detection module detecting a location-change information according to movement of the movable slide button, wherein the location-detection module includes a connection line coupler, which has connection lines, checking the movement of the movable slide button; a restorer, coupled with the connection line coupler, returning the slide button to an original location due to an elastic force; a scale indicator, coupled with the connection line coupler, indicating a scale of a specific interval according to the movement of the movable slide button; and an optical sensor sensing a brightness change value of the scale according to the movement of the movable slide button to produce a signal corresponding to the sensed brightness change value.

In still another aspect of the present invention, there is provided a location-detection module detecting a location-change information according to movement of a movable slide button, wherein the location-detection module includes a connection line coupler, which has connection lines, checking the movement of the movable slide button; a scale indicator, coupled with the connection line coupler, indicating a scale of a specific interval according to the movement of the movable slide button; and an optical sensor sensing a brightness change value of the scale according to the movement of the movable slide button to produce a signal corresponding to the sensed brightness change value.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF THE PREFERRED EMBODIMENTS

Figure 1:
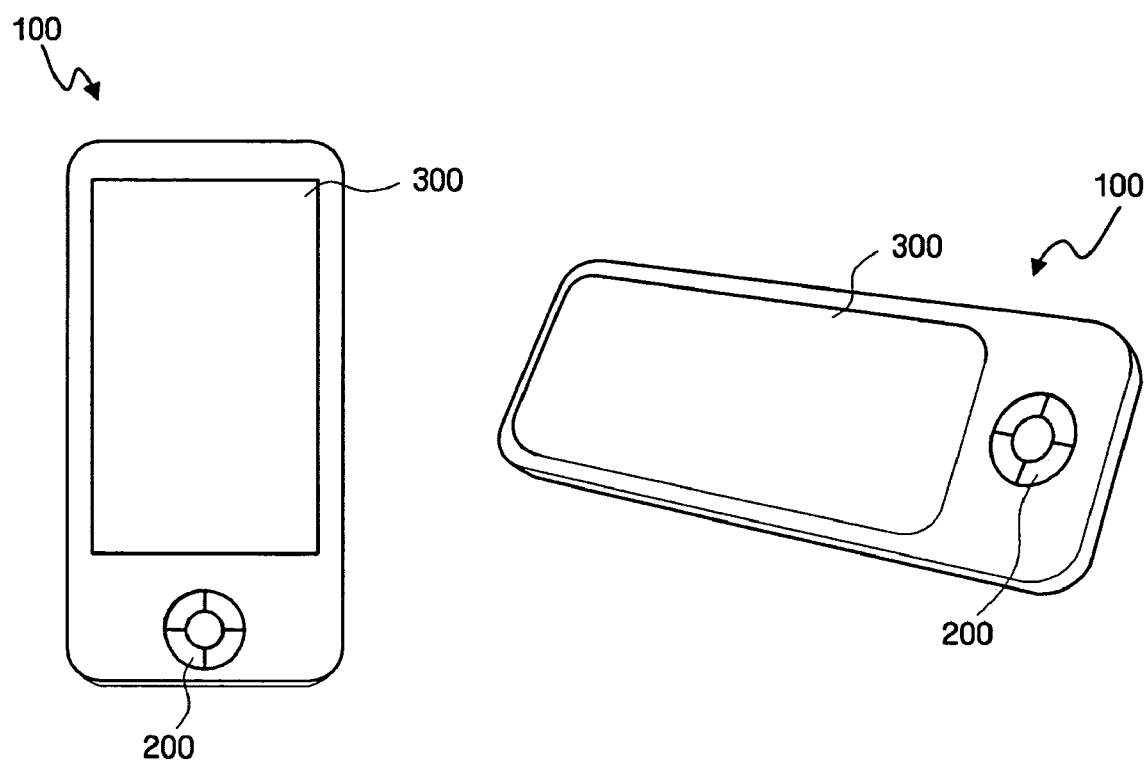
FIG. 1 is a schematic diagram illustrating a portable device provided with a slide-type input device according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Exemplary embodiments of the present invention will be described with reference to the accompanying drawings illustrating block diagrams and flowcharts for explaining a slide-type input device, a portable device provided with the input device and a method for using the input device according to the present invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, implement the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded into a computer or other programmable data processing apparatus to cause a series of operational steps to be performed in the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order, depending upon the functionality involved.

FIG. 1 is a schematic diagram illustrating a portable device provided with a slide-type input device according to an exemplary embodiment of the present invention.

Referring to FIG. 1, the portable device 100 includes an input device 200 and a display panel 300. The portable device 100 can use voice and image information, and can be, for example, a mobile phone, Personal Digital Assistants (PDAs), MPEG Audio Layer-3 (MP3) player, notebook computer, Portable Multimedia Player (PMP), or a portable gaming device. An example of a mobile phone is a smart phone. The smart phone may include and/or execute program instructions such as Microsoft® Windows Mobile® program instructions or the like.

The input device 200 includes a slide button movable in a specific direction, which can move a pointer displayed on a screen or can select an object on which the pointer is located, by moving and selecting the slide button by an external force of a user. Herein, the term "movement of the slide button" denotes a slide button moving in a specific direction after the user applies a pressure less than a specific threshold value to the slide button. The term "selection of the slide button" denotes a slide button being pushed by a user to apply a pressure more than a specific threshold value to the slide button. In another exemplary embodiment, if the pressure applied to the slide button is equal to a specified threshold value, then there is "movement of the slide button." In another alternative exemplary embodiment, if the pressure applied to the slide button is equal to a specified threshold value, then there is "selection of the slide button." The input device 200 will be explained in detail with reference to FIG. 2.

The display panel 300 displays the pointer, whose location is changed according to a movement direction of the input device 200, and the object where the pointer is located. A screen displayed on the display panel will be explained with reference to FIG. 7.

The input device 200 according to the present invention may be used instead of a mouse by mounting it in a computer keyboard.

Figure 2A:
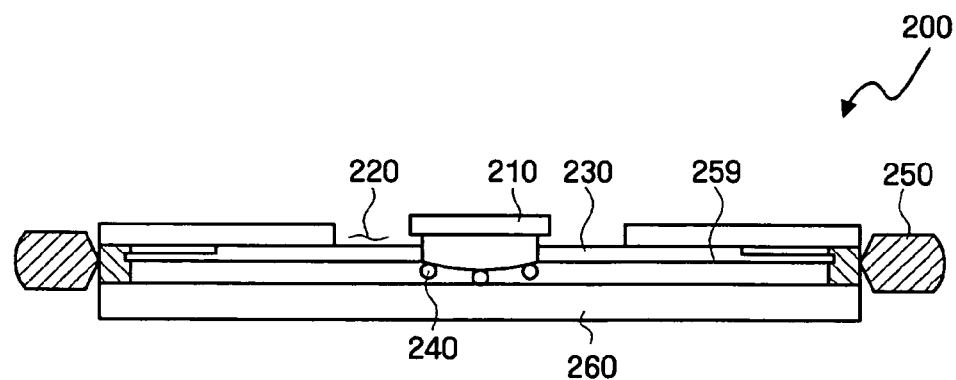
FIG. 2A is a sectional diagram illustrating a slide-type input device in a portable device according to another exemplary embodiment of the present invention.
Figure 2B:
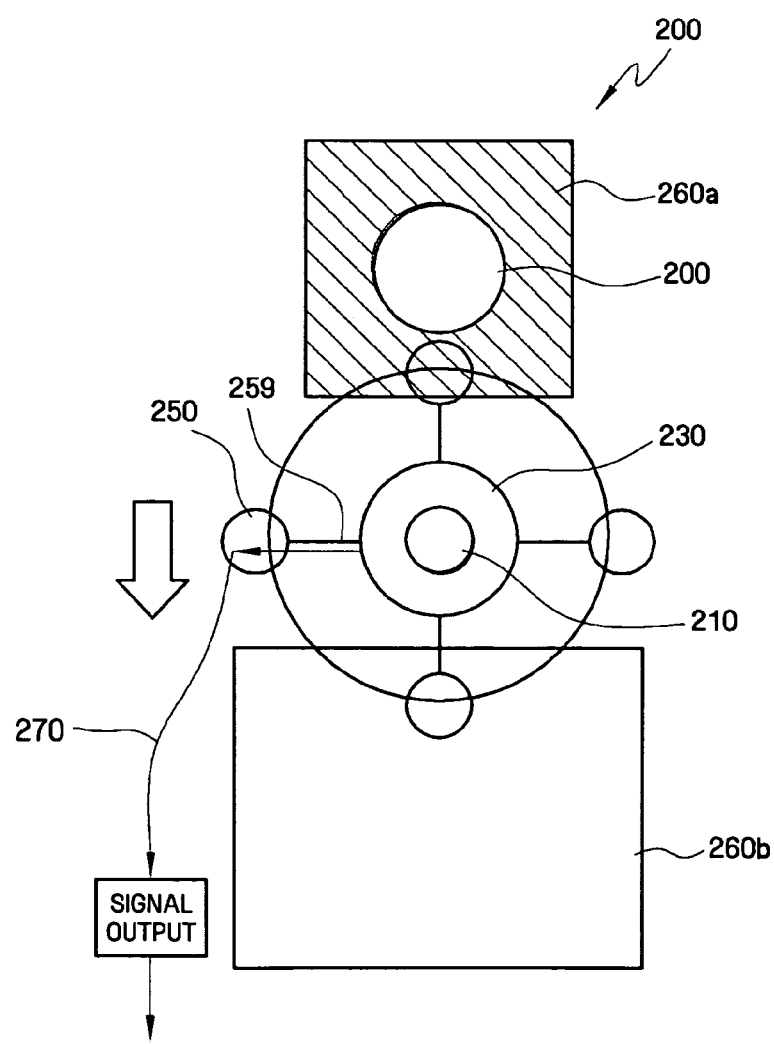
FIG. 2B is an exploded perspective diagram illustrating the slide-type input device in the portable device according to another exemplary embodiment of the present invention

FIG. 2A is a sectional diagram illustrating a slide-type input device in a portable device according to another exemplary embodiment of the present invention. FIG. 2B is an exploded perspective diagram illustrating the slide-type input device in the portable device according to another exemplary embodiment of the present invention.

Referring to FIG. 2A, the input device 200 includes a slide button 210, a motion control hole 220, a protection plate 230, a bearing 240, a location-detection module 250, and a housing 260.

First, a combined relationship between components of the input device 200 will be explained.

The slide button 210, the motion control hole 220, the protection plate 230, the bearing 240, the location-detection module 250, all of which are located in the housing, are integrated as one body. The bearing 240 is coupled to a lower part of the slide button 210 to help the movement of the slide button 210.

The location-detection module 250 is coupled to upper/lower and left/right sides of the slide button 210. A connection line 259 is coupled between the slide button 210 and the location-detection module 250.

The protection plate 230 is coupled on the circumference of the slide button 210, and is tightly sealed with an upper plate of the housing 260, thereby preventing foreign materials such as dust from entering the housing 260.

The motion control hole 220 is located on an upper surface of the protection plate 230 to restrict the movement of the slide button 210.

Functions for each component of the input device 200 will be explained in the following.

The slide button 210 is moved in a specific direction. For example, the slide button 210 is freely moved in any direction by a user applying a force less than a specific threshold value to the slide button 210, and when the user tries to select a specific object, if the slide button 210 is pushed by a user applying a force more than the specific threshold value, the corresponding object can be selected.

The pointer displayed on the screen is moved in a direction corresponding to the movement direction or the movement location of the slide button 210.

The motion control hole 220 is a hole surrounding the slide button 210. A lower part of the motion control hole 220 is attached with the upper part of the housing 260. Further, the motion control hole 220 restricts a movement distance of the slide button 210. If the slide button 210 is located around a boundary of the motion control hole 220 for a specific time, the pointer displayed on the screen is continuously moved in a direction corresponding to a place where the slide button 210 is located.

The location-detection module 250 detects location information that is changed according to the movement of the slide button 210. The connection lines 259 coupled with each location-detection module 250 are also connected with the slide button 210 so as to enable the moved-to location information of the slide button 210 to be detected.

For example, when the slide button 210 is moved in a specific direction by the external power of the user, the location-detection module 250 is rotated. Accordingly, the length of the connection lines, which are coupled to the upper/lower and left/right surfaces of the slide button 210, is changed.

The location-detection module 250 detects the length of the changed connection lines 259, thereby allowing the movement location of the slide button 210 to be detected. The location-detection module 250 will be explained in detail with reference to FIG. 3.

Referring to FIG. 2B, when the slide button 210 is moved, the location-detection module 250 is rotated, thereby allowing the length of the connection lines coupled to the location-detection module 250 to be changed.

The location-detection module 250 transmits values of the changed length of the connection lines 259 to a controller by wire 270.

Figure 3:
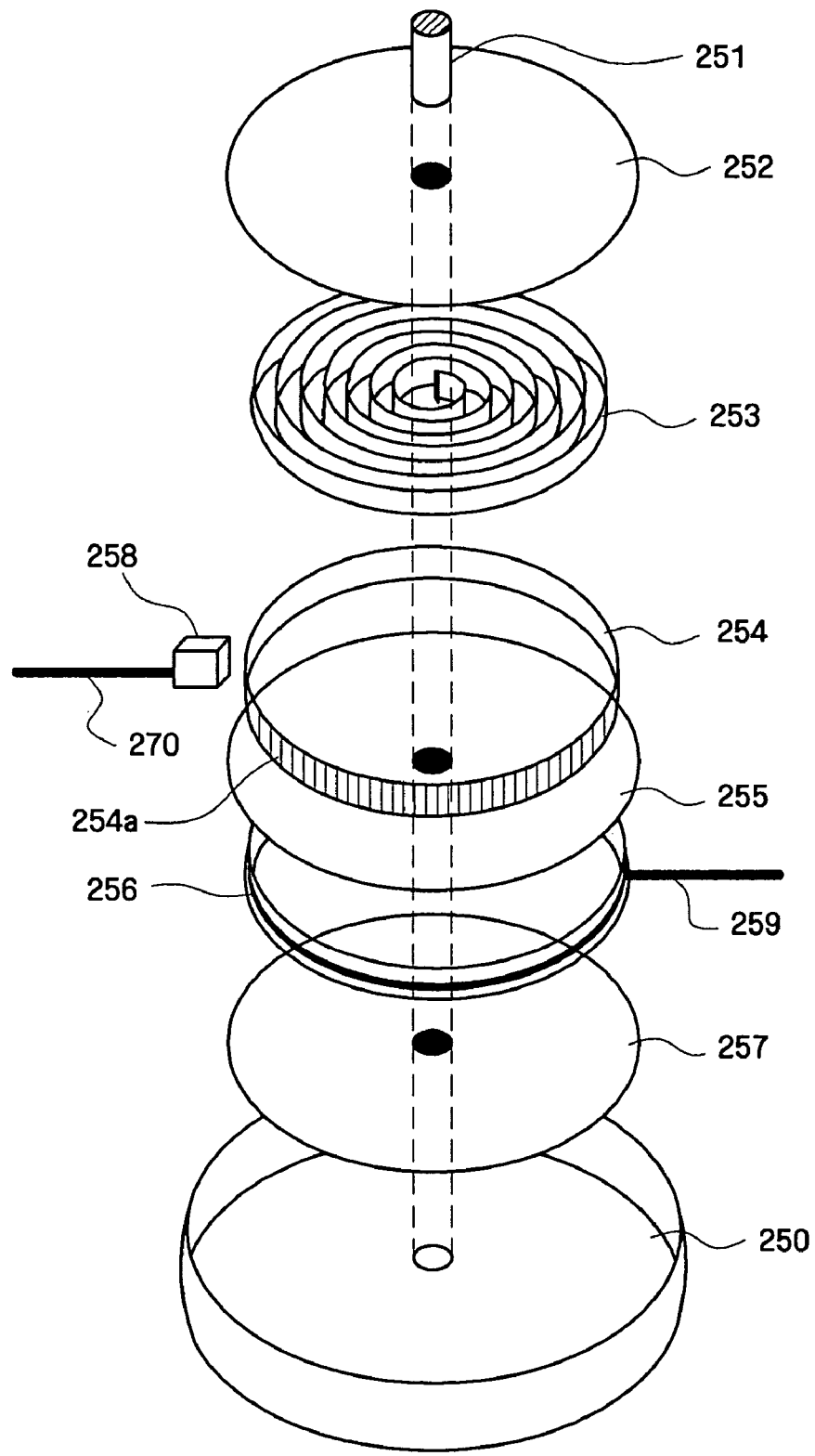
FIG. 3 is an exploded perspective diagram illustrating a location-detection module in the slide-type input device according to another exemplary embodiment of the present invention.

FIG. 3 is an exploded perspective diagram illustrating a location-detection module 250 in the slide-type input device according to another exemplary embodiment of the present invention.

Referring to FIG. 3, the location-detection module 250 includes a central axis 251, support plates 252, 255, and 257, a restoration part (restorer) 253, a scale indicator 254, a connection line coupling part (connection line coupler) 256, an optical sensor 258 and a connection line 259. In the location-detection module 250, the central axis 251, the support plates 252, 255, and 257, the restoration part 253, the scale indicator 254, and the connection line coupling part 256 are coupled as one body.

The connection line coupling part 256 couples the connection lines 259 for detecting the movement location of the slide button 210. The connection line coupling part 256 is rotated about the central axis 251 while winding or unwinding the connection lines 259.

For example, if the slide button 210 is moved by an external force of the user, some of the four connection lines 259 connected to the slide button 210 become lengthened, and the other connection lines are shortened. Accordingly, the connection lines 259 are wound on the connection line coupling part 256 according to the lengthening or shortening. The connection line coupling part 256 is rotated by winding or unwinding the connection lines 259.

The restoration part 253 is coupled with the connection line coupling part 256 through the central axis, and is rotated in the same direction as the connection line coupling part 256 while the slide button 210 is moved. The restoration part 253 is constituted of an elastic body like a spring, so as to enable the slide button 210 to be returned to an original location due to an elastic force that acts when the external force applied by the user is removed.

The scale indicator 254 is coupled with the connection line coupling part 256 through the central axis, and is rotated in the same direction as the connection line coupling part 256 while the slide button 210 is moved. A scale 254a is indicated on an outer surface of the scale indicator 254 at a desired interval. The scale 254a is rotated while the scale indicator 254 is rotated.

When the scale indicator 254 is rotated according to the slide button moved by the user, the optical sensor 258 detects a value, to which the brightness of the scale 254a is changed, to produce a signal corresponding to the changed value.

For example, if a brightness value and a darkness value are alternately checked by the rotation of the scale indicator 254 and the scale 254a, the optical sensor 258 detects either the brightness value or the darkness value to produce a signal corresponding to the detected value.

Figure 4:
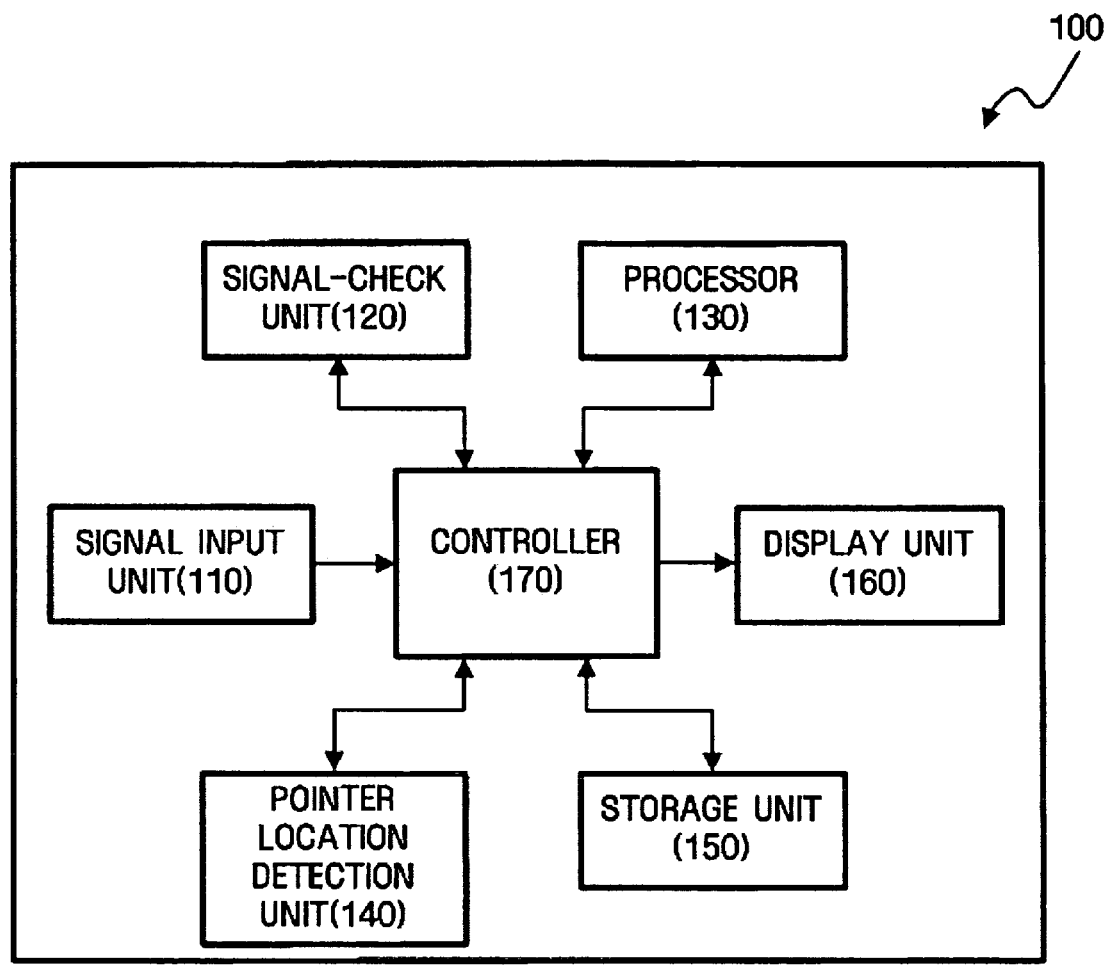
FIG. 4 is an internal block diagram illustrating the portable device provided with the slide-type input device according to another exemplary embodiment of the present invention.

FIG. 4 is an internal block diagram illustrating the portable device provided with the slide-type input device according to another exemplary embodiment of the present invention.

Referring to FIG. 4, the portable device 100 includes a signal input unit 110, a signal-check unit 120, a processor 130, a pointer-location detection unit 140, a storage unit 150, a display unit 160, and a controller 170.

In the exemplary embodiment of the present invention, the term "unit", as used herein, denotes, but is not limited to, a software or hardware component, such as a Field Programmable Gate Array (FPGA) or an Application Specific Integrated Circuit (ASIC), which performs certain tasks. A unit may advantageously be configured to reside in the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented so as to execute one or more CPUs in a device.

The signal input unit 110 receives a movement signal and a selection signal of the slide button 210, all signals of which are produced by the user.

If a certain signal produced by the user is inputted to the signal-check unit 120 by the signal input unit 110, the signal-check unit 120 checks whether the inputted signal is the movement signal or the selection signal of the slide button 210.

As a result, if the inputted signal is the movement signal of the slide button 210 (i.e., a brightness change value of the scale detected by the optical sensor 258), the movement signal of the slide button 210 is transmitted to the processor 130. If the inputted signal is the selection signal of the slide button 210 (e.g., the case where the pressure is more than the specific threshold value given to the slide button), the selection signal is transmitted to the processor 130.

The processor 130 calculates a location and a change of volume of the movement of the slide button 210 based on a signal that corresponds to the changed value of the scale transmitted from the signal-check unit 120. The processor 130 also calculates a location of the movement of the pointer and whether the pointer approaches the boundary of the motion control hole 220.

Figure 5:
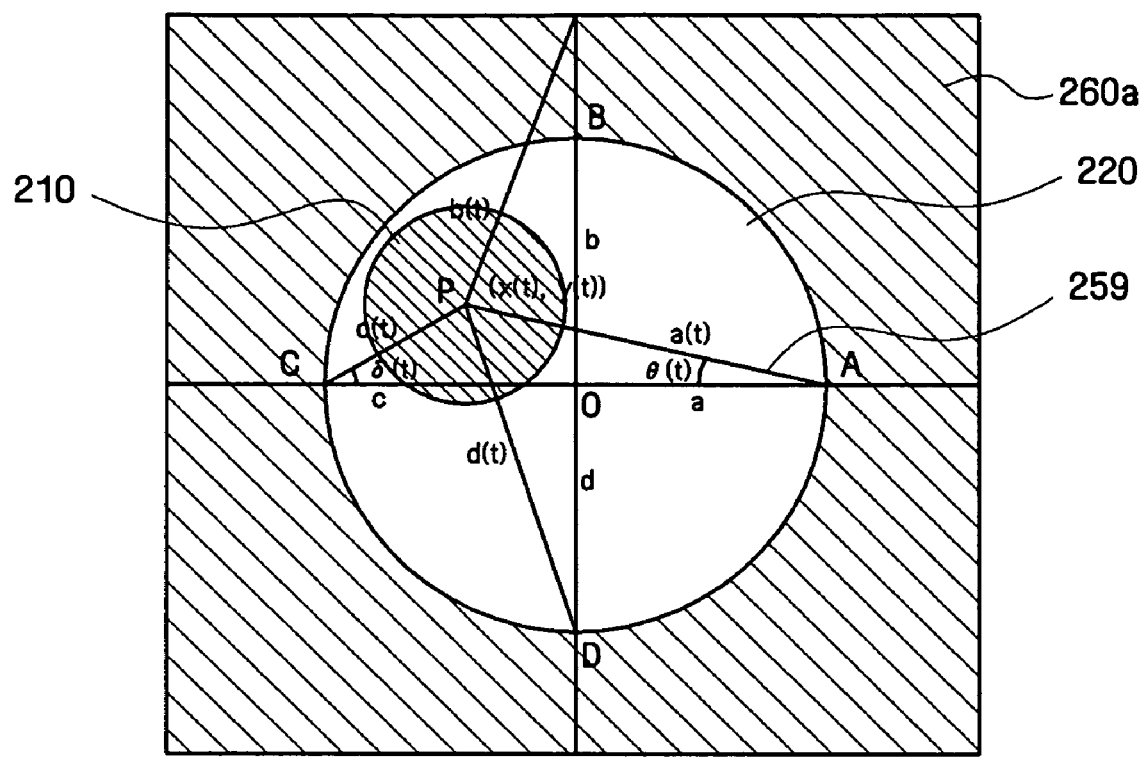
FIG. 5 is a diagram illustrating a method for measuring a location of a slide button using a processor of a portable device provided with the slide-type input device according to another exemplary embodiment of the present invention.

A method of calculating the location and the change volume of the movement of the slide button 210 as well as the location of the movement of the pointer will be explained with reference to FIG. 5 in the following.

For example, it is assumed that if the center of the motion control hole 220 is "O", four points where the connection lines 259 intersect in the upper plate 260a are respectively A, B, C and D, a length of a line segment OA is "a", a length of a line segment OB is "b", a length of a line segment OC is "c", and a length of a line segment OD is "d". In this case, since "O" is located at the center of the motion control hole 220, a=c, and b=d.

First, a(t), b(t), c(t) and d(t), the length of four connection lines 259, are measured from length changes of the connection lines 259 or a length change of the restoration part 253 at time (t).

Next, it is assumed that if a coordinate of the center of the slide button 210 is (x(t), y(t)) at time (t), angle PAC is $\theta(t)$, angle PCA is $\delta(t)$, and the coordinate of "O" is (0, 0).

In this case, x(t) is expressed by Equation 1:

$$x(t)=a-a(t)\cos\theta(t)=-a+c(t)\cos\delta(t)[$$

Using the second law of cosines, Equation 1 can be represented as:

$$\begin{aligned}x(t) &= a - a(t)\cos\theta(t) \\ &= a - a(t)\frac{4a^2 + a^2(t) - c^2(t)}{4aYa(t)}\ \sqsubset \\ &= \frac{c^2(t) - a^2(t)}{4a}\ \sqsubset \\ &= \frac{(c(t) - a(t))(c(t) + a(t))}{4a}\ \sqsubset\end{aligned}$$

y(t) is obtained by Equation 2:

$$y(t) = \frac{(d(t) - b(t))(d(t) + b(t))}{4b}\ \sqsubset$$

At time (t+1), the changed volume of x(t) and y(t) is expressed by Equation 3:

$$\Delta x(t+1)=x(t+1)-x(t)$$

$$\Delta y(t+1)=y(t+1)-y(t)$$

In other words, if the volume at time (t) is subtracted from that of time (t+1), the changed volume of x(t) and y(t) may be obtained.

The movement location of the pointer located on the screen is obtained by Equation 4:

$$X(t+1)=X(t)+\Delta x(t+1)Yk_1$$

$$Y(t+1)=Y(t)+\Delta yx(t+1)Yk_2$$

where X(t) and Y(t) denote a present location of the pointer, $\Delta x(t+1)$ and $\Delta y(t+1)$ denote the changed volume of the movement of the slide button 210, and $k_1$ and $k_2$ denote arbitrary constants.

Further, a method of checking whether the slide button 210 is located around the boundary of the motion control hole 220 is performed using Equation 5:

$$a^2(t)+c^2(t)E4a^2-\epsilon_1$$

$$b^2(t)+d^2(t)E4b^2-\epsilon_2$$

where each of $\epsilon_1$ and $\epsilon_2$ is a boundary margin. If the slide button 210 is located around the boundary of the motion control hole 220, a boundary arrival speed, i.e., each value of $\Delta x(t)$ and $\Delta y(t)$ is stored in the storage unit 150, and the pointer is continuously moved by the stored values. Further, even though a central point of the slide button 210 is not located on the boundary of the motion control hole 200, it is decided that the central point of the slide button 210 shall be located on the boundary of the motion control hole 200 considering the boundary margin, even in the case where the central point thereof is located around the boundary of the motion control hole 200.

The pointer detection unit 140 detects the pointer's location displayed on the screen in order to move the pointer location based on the slide button's location, which is calculated by the processor 130.

The storage unit 150 stores the moved-to location of the pointer, which is calculated by the processor 130.

The display unit 160 displays the pointer, whose location is changed by the movement of the slide button 210, and the object selected by the pointer.

The controller 170 controls function blocks 110, 120, 130, 140, 150 and 160 of the portable device 100. The controller 170 can be considered a type of processor.

Figure 6:
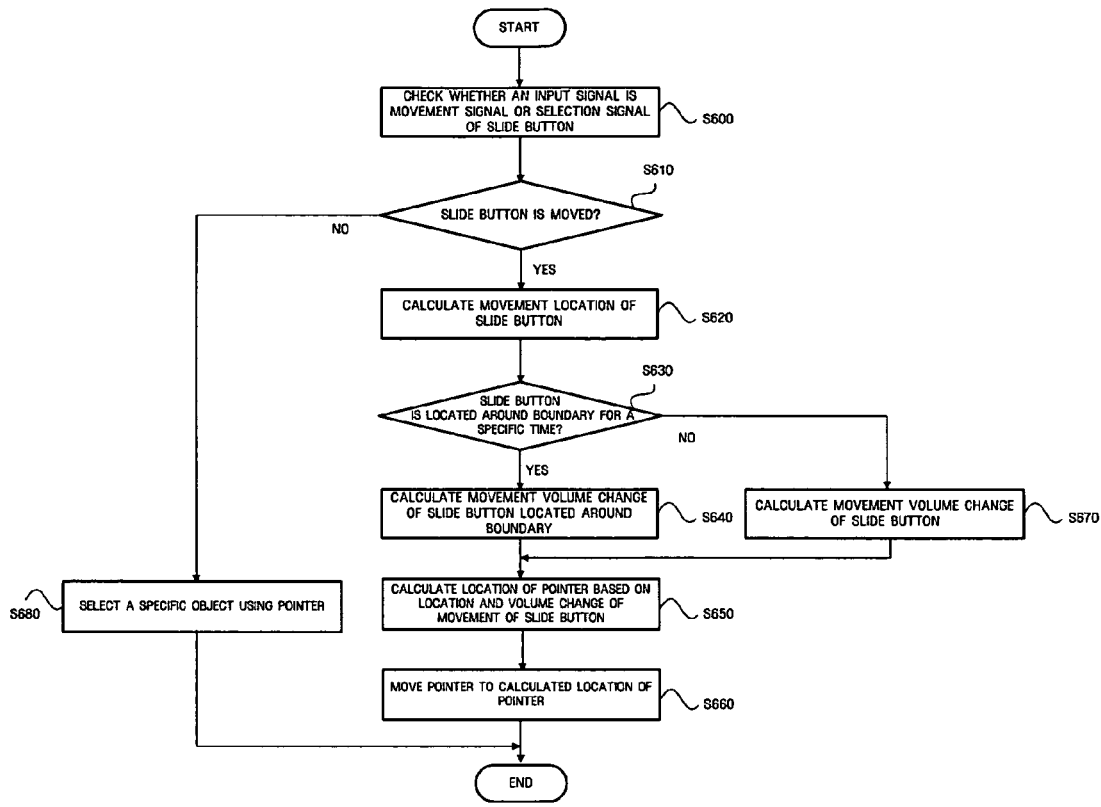
FIG. 6 is a flowchart illustrating processes of using a slide-type input device according to still another exemplary embodiment of the present invention.

FIG. 6 is a flowchart illustrating processes of using a slide-type input device according to still another exemplary embodiment of the present invention.

First, if a signal produced by the user is inputted to the signal-check unit 120 through the signal input unit 110, the signal-check unit 120 checks whether the inputted signal is a movement signal or a selection signal of the slide button 210 (S600). For example, if the inputted signal is the movement signal of the slide button 210, a signal that corresponds to a brightness change value of the scale detected by the optical sensor 258 is inputted to the controller 170. If the inputted signal is the selection signal, a signal that corresponds to a pressure value more than the specific threshold value is inputted to the controller 170.

As a result of the checking, if the slide button 210 is moved (S610), the signal-check unit 120 detects the pressure of the slide button 210 again. In the case where the pressure value of the slide button 210 is included within a constant threshold range, the signal-check unit 120 transmits the movement signal to the controller 170, the movement signal being the signal that corresponds to the brightness change value of the scale detected by the optical sensor 258. The control unit 170 transmits the movement signal transmitted by the signal-check unit 120 to the processor 130. This enables the pointer on the screen to move only when the slide button 210 is moved by the user's finger, and does not enable the pointer on the screen to move while the slide button 210 is returned to the original location by taking off the user's finger from the button 210.

Hereafter, a process of detecting the changed value of the scale brightness using the optical sensor will be explained.

First, if the slide button 210 is moved in the specific direction by the external force applied by the user, each length of the connection lines connected to the slide button 210 in four directions is differently changed.

Next, four location-detection modules 250 coupled with four connection lines 259 are rotated by winding or unwinding four connection lines. When the location-detection modules 250 are rotated, the scale indicator 254 in the location-detection module 250 is simultaneously rotated, and thus the scale indicated in the scale indicator 254 is also rotated.

The optical sensor 258 detects a brightness change value of the scale that is simultaneously rotated with the scale indicator 254, and generates a signal corresponding to the detected brightness change value of the scale. The generated signal is inputted via the signal input unit 110.

The processor 130 calculates a movement location of the slide button 210 based on the movement signal (i.e., brightness change value of the scale) transmitted by the controller 170 (S620). The movement location of the slide button 210 is calculated using Equations 1 and 2.

The processor 130 also judges whether the slide button 210 is located around the boundary of the motion control hole 220. The decision is using Equation 5.

As a result of the judgment, if the slide button 210 is located around the boundary of the motion control hole 220 (S630), the processor 130 calculates the movement volume change of the slide button 210 (S640).

The controller 170 calculates a location of the pointer that is displayed on the screen based on the calculated location and volume change of the movement of the slide button 210 (S650). The location of the pointer is obtained by Equation 4.

The controller 170 controls the display unit 160 for displaying the pointer moved to the location calculated by Equation 4 (S660). The pointer is continuously moved in the movement direction of the slide button 210.

As a result of the checking of whether an input signal is movement signal or selection signal of slide button (S600), if the inputted signal by the signal input unit 110 is the selection signal of the slide button 210 (S610), the controller 170 checks the location of the pointer that is stored in the storage unit 150, and controls the display unit 160 so as to enable a specific object selected by the checked pointer to be displayed on the screen (S680).

As a result of the judgment (S630), if the slide button 210 is not located around the boundary of the motion control hole 220 (S630), the processor calculates the movement volume change of the slide button 210 moved by the external force applied by the user (S670), and calculates the movement location of the pointer based on the calculated movement volume change (S650).

Accordingly, the user can easily operate the pointer by using the slide button 210 that moves the pointer to a desired location on the screen to select a desired object.

FIG. 7 is a diagram illustrating an operating screen of a portable device provided with the slide-type input device according to still another exemplary embodiment of the present invention.

Referring to FIGS. 7A through 7D, the pointer 310 and the desired objects are displayed on the display panel 300 of the portable device, where the pointer 310 is moved according to the movement location and the movement volume change of the input device.

Figure 7A:
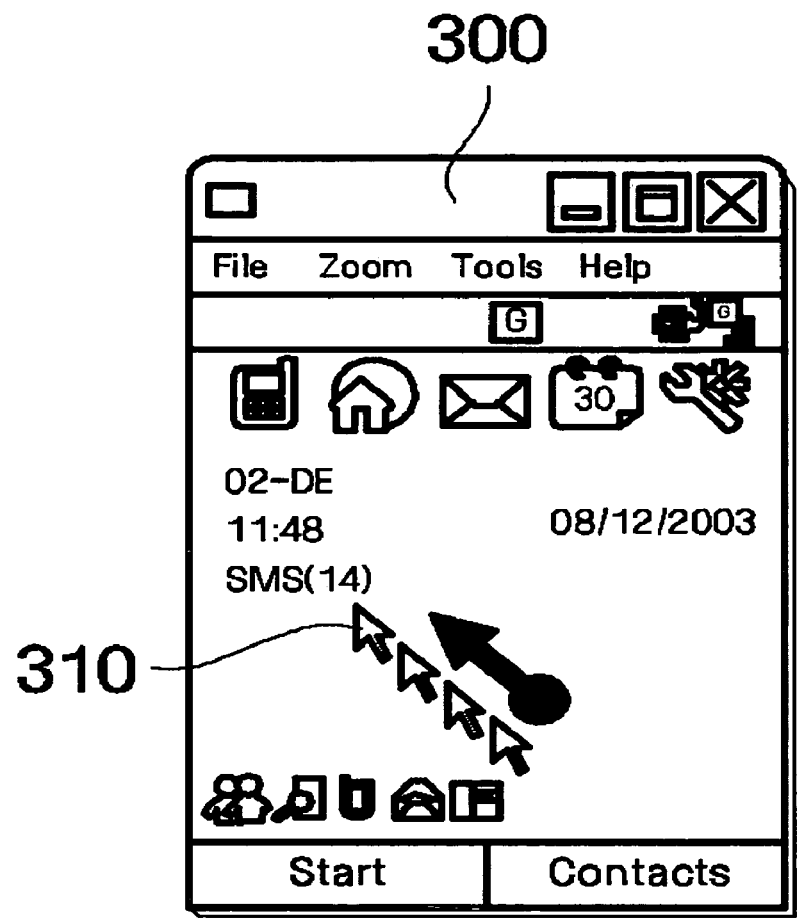
FIGS. 7A through 7D are diagrams illustrating an operating screen of a portable device provided with the slide-type input device according to still another exemplary embodiment of the present invention.
Figure 7A:
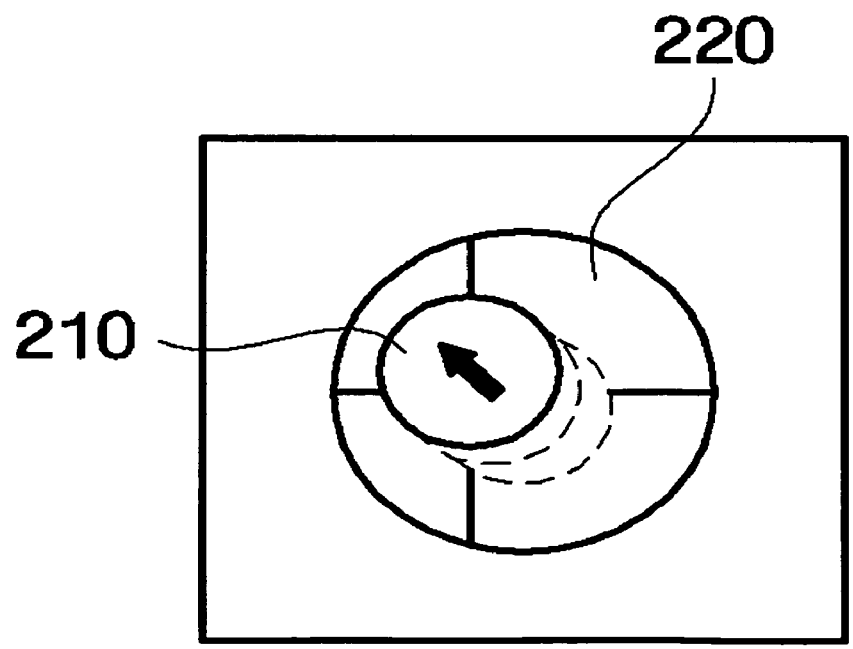

As shown in FIG. 7A, when the slide button 210 is moved in an upper-left direction by the external force applied by the user, the pointer 310 displayed on the display panel is moved in the same direction as the slide button 210. The movement location of the pointer 310 is calculated based on the movement location and the movement volume change of the slide button 210 so as to move the pointer to a corresponding location.

Figure 7B:
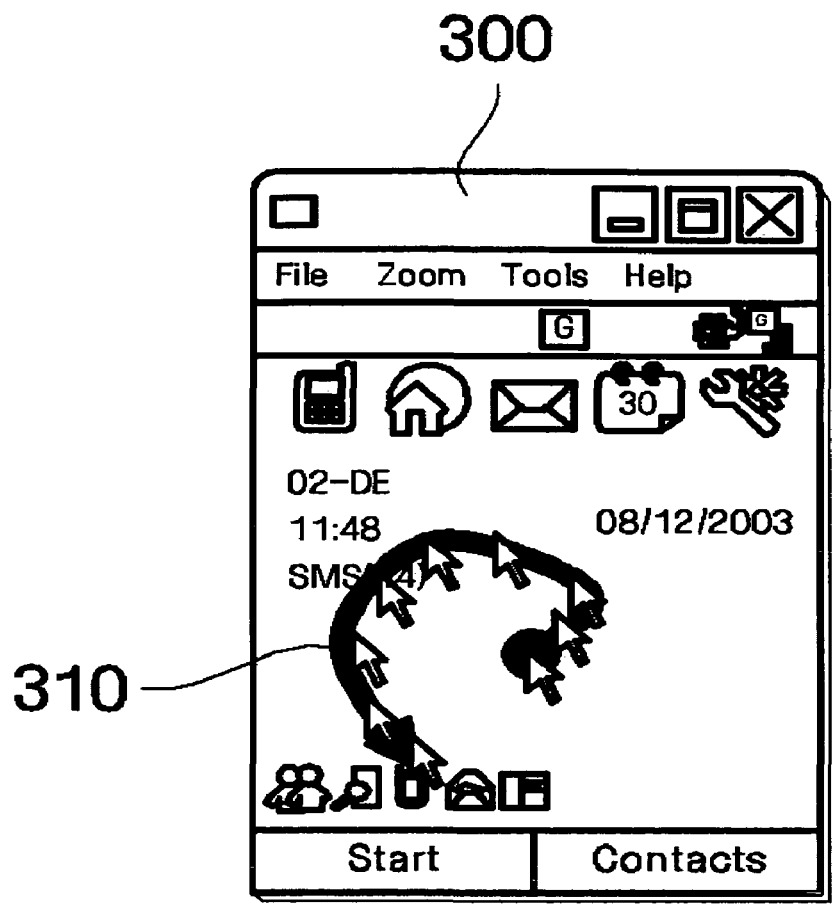
Figure 7B:
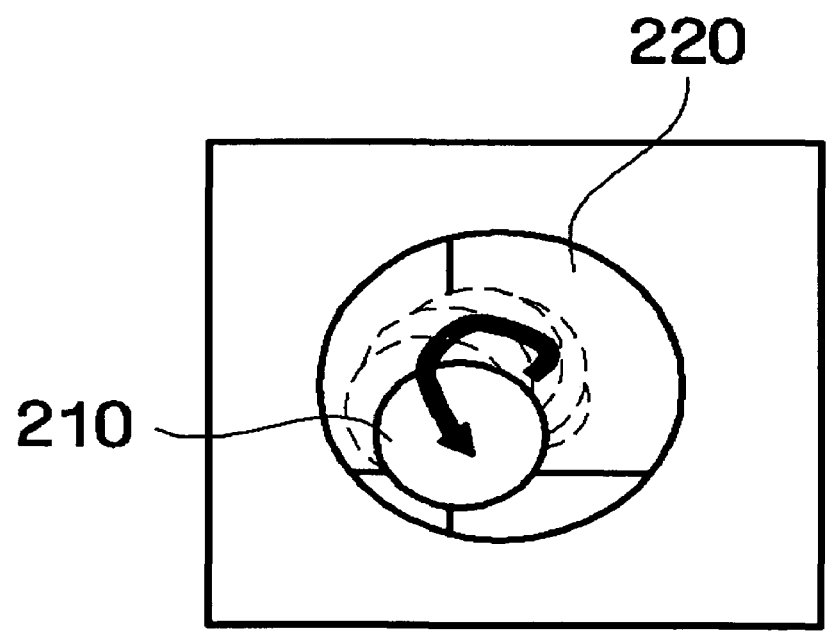

As shown in FIG. 7B, when the user moves the slide button 210 in multiple directions, the pointer 310 displayed on the display panel 300 is moved in the same direction as the slide button 210.

Figure 7C:
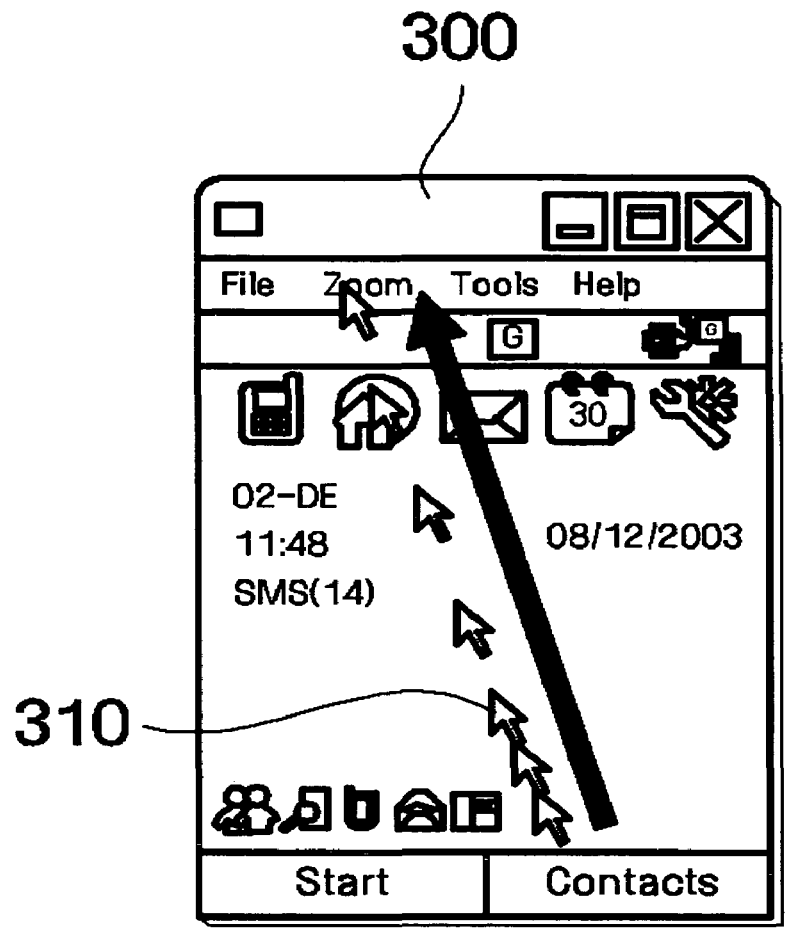
Figure 7C:
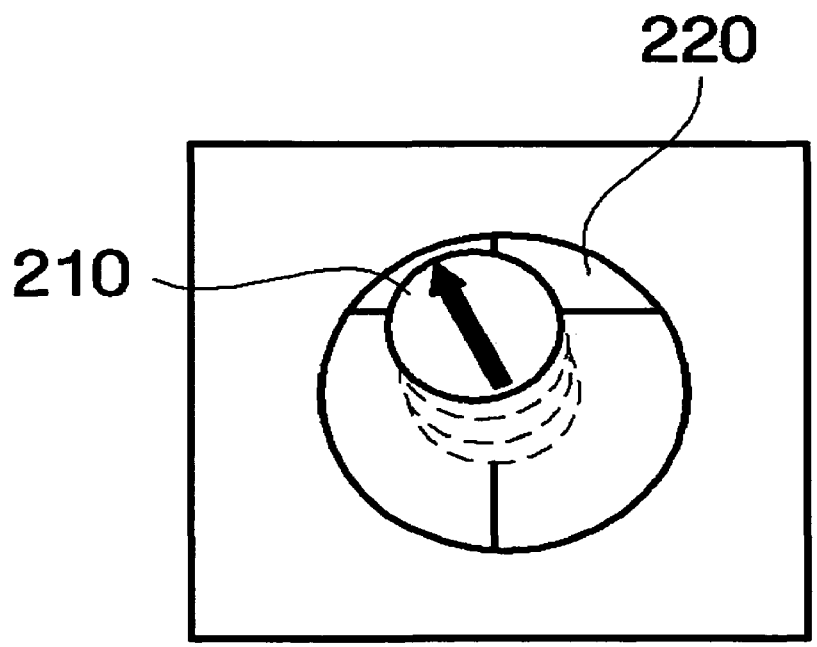

As shown in FIG. 7C, the user locates the slide button 210 around the boundary of the motion control hole 220. At this time, if the slide button 210 is located around the boundary of the motion control hole 220 for a certain period of time, the pointer 310 is continuously located in a direction corresponding to the location that the slide button 210 is contact with the boundary of the motion control hole 220.

Figure 7D:
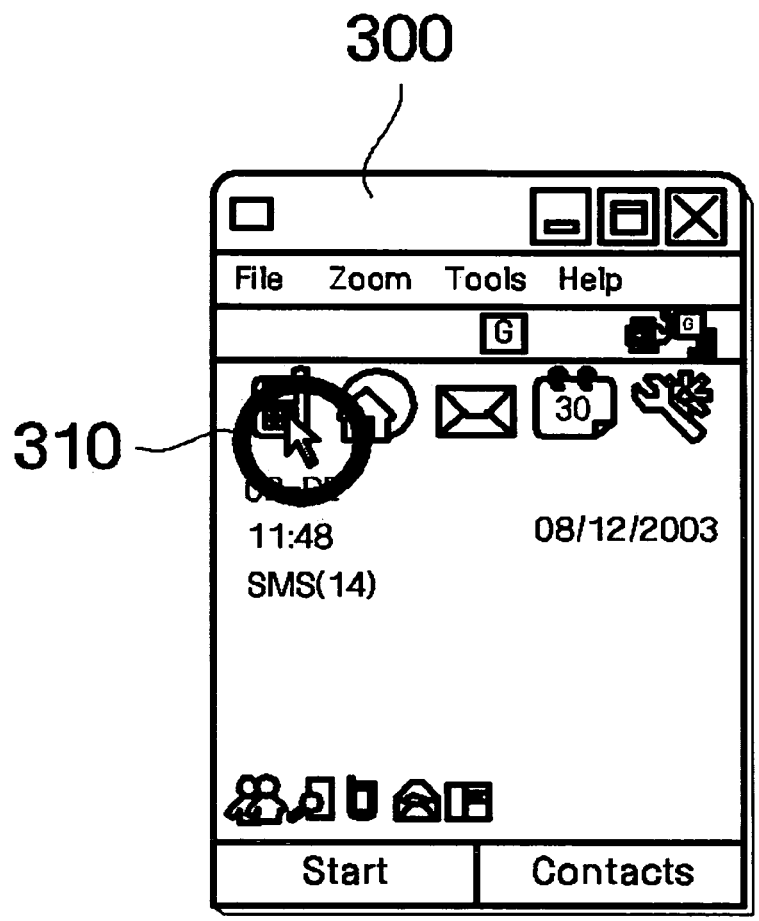
Figure 7D:
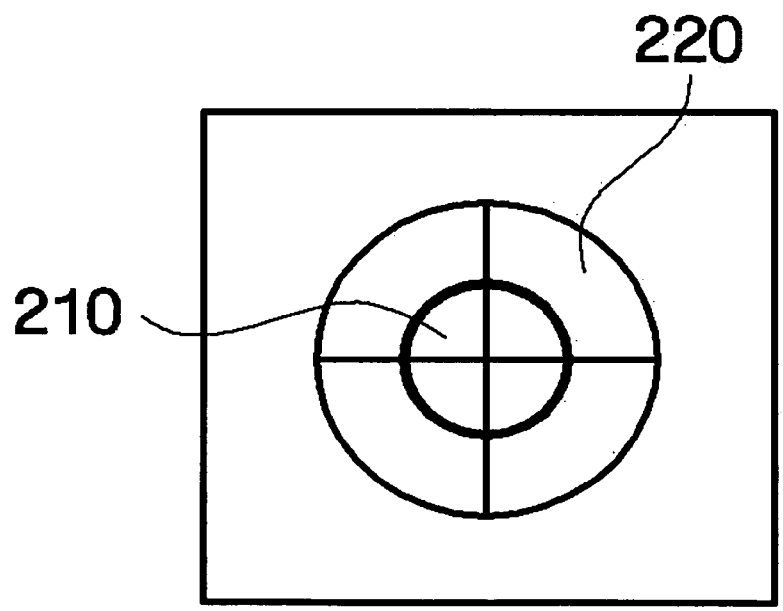

As shown in FIG. 7D, the slide button 210 is selected by the external force of the user. In other words, when the pointer is located on the specific object, if the user creates more pressure than the specific threshold value by applying a force to the slide button, the object, on which the pointer 310 is located, is selected and displayed on the display panel 300. The object may be represented on a display by an icon, text, and the like, for example.

Accordingly, since the operations of the slide-type input device 200 are similar to those of the mouse, the user can easily move the pointer in the desired direction, and conveniently select the desired object.

Meanwhile, if the external force applied by the user is removed, the slide button 210 is returned to the original location by the elastic force created by the restoration part 253. At this time, the pointer 310 on the screen does not move because the pressure given in the slide button 210 is lower than the constant threshold value.

The slide button 210 may be separated into a plurality of slide buttons. When the slide button 210 is separated into left/right sides, if the user selects the left side of the slide button 210, some of the operations of the slide button 210 are performed, and if the user selects the right side of the slide button 210, the other operations of the slide button 210 are performed.

As describe above, the slide-type input device, the portable device provided with the input device, and the method of using the input device, according to the present invention, produce the following effects.

First, the slide-type input device can more freely move the pointer displayed on the screen, and more conveniently and exactly select the specific object.

Second, a correct coordinate, in which the slide button is moved, can be obtained by changing the lengths of the connection lines connected to the location-detection module.

Third, an instinctive and convenient input device is provided to the user, by freely moving the slide button within the motion control hole.

Fourth, the slide-type input device has functions and applications similar to the conventional mouse, thereby allowing the user to conveniently use it.

Fifth, the size of the slide-type input device is smaller than that of the conventional point device, thereby allowing the portable device to be smaller and thinner.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A slide-type input device comprising:
a slide button movable in a specific direction;
a motion control hole which provides a movement area of the slide button;
a location-detection module to detect a location-change information according to the movement of the slide button; and
a controller to control a pointer displayed on a screen based on the location-change information of the slide button,
wherein the slide button is moved in the specific direction by an external force applied by a user, and then is returned to an original location by an elastic force when the external force is removed, and
wherein the location-detection module comprises a connection line coupling part, which has connection lines, to check the movement location of the slide button, and a scale indicator, coupled with the connection line coupling part through a central axis and rotated in the same direction as the connection line coupling part while the slide button is moved, to indicate a scale of a specific interval according to the movement of the slide button, and a restoration part, coupled with the connection line coupling part through the central axis, to return the slide button to an original location due to the elastic force caused by the movement of the slide button.

2. The slide-type input device of claim 1, wherein if the slide button is moved by the external force of the user, the location-detection module measures a movement vector of the slide button to detect a movement location of the slide button.

3. The slide-type input device of claim 1, wherein if a pressure more than a specific threshold value is created by the external force applied to the slide button by the user, a specific object on which the pointer is located is selected.

4. The slide-type input device of claim 1, wherein if a pressure less than a specific threshold value is created by the external force applied to the slide button by the user, the pointer is moved.

5. The slide-type input device of claim 1, wherein if the slide button is located around a boundary of the motion control hole for a specific time, the pointer is continuously moved in a direction corresponding to the location.

6. The slide-type input device of claim 1, wherein the motion control hole has a circular shape.

7. The slide-type input device of claim 1, wherein the location-detection module further comprises:
an optical sensor to sense a brightness change value of the scale according to the movement of the slide button so as to produce a signal corresponding to the sensed brightness change value.

8. A portable device provided with a slide-type input device, comprising:
an input device moving in a specific direction by an external force of a user and selecting a specific object;
a pointer whose location is changed according to a movement direction of the input device and a display panel displaying an object that is selected by the pointer, pointer;
a slide button movable in a specific direction;
a motion control hole which provides a movement area of the slide button;
a location-detection module to measure a movement distance of the slide button if the slide button is moved by the external force of the user, and returning the slide button to an original location due to an elastic force caused by removing the external force of the user; and
a controller to control a pointer displayed on a screen based on location-change information of the slide button, and
wherein the location-detection module comprises a connection line coupling part, which has connection lines, to check the movement location of the slide button, and a scale indicator, coupled with the connection line coupling part through a central axis and rotated in the same direction as the connection line coupling part while the slide button is moved, to indicate a scale of a specific interval according to the movement of the slide button, and a restoration part, coupled with the connection line coupling part through the central axis, to return the slide button to an original location due to the elastic force caused by the movement of the slide button.

9. The portable device of claim 8, wherein if a pressure more than a specific threshold value is created by the external force applied to the slide button by the user, a specific object where the pointer is located is selected.

10. The portable device of claim 8, wherein if a pressure less than a specific threshold value is created by a force applied by the user to the slide button, the pointer is moved.

11. The portable device of claim 8, wherein if the slide button is located around a boundary of the motion control hole for a specific time, the pointer is continuously moved in a direction that corresponds to the location.

12. The portable device of claim 8, wherein the location-detection module further comprises:
an optical sensor sensing a brightness change value of the scale according to the movement of the slide button to produce a signal corresponding to the sensed brightness change value.

13. A method of using a slide-type input device, comprising:
- moving a slide button in a specific direction, wherein the slide button is moved by a user;
- calculating a location using a location detection module and a change volume of the movement of the slide button;
- moving a pointer based on the calculated movement location and movement volume change; and
- returning the slide button to an original location due to an elastic force caused by an external force of a user,
- wherein the location-detection module comprises a connection line coupling part, which has connection lines, to check the movement location of the slide button, and a scale indicator, coupled with the connection line coupling part through a central axis and rotated in the same direction as the connection line coupling part while the slide button is moved, to indicate a scale of a specific interval according to the movement of the slide button, and a restoration part, coupled with the connection line coupling part through the central axis, to return the slide button to an original location due to the elastic force caused by the movement of the slide button.

14. The method of claim 13, wherein if the slide button is moved by the external force of the user, a movement vector of the slide button is measured.

15. The method of claim 13, wherein if a pressure more than a specific threshold value is given to the slide button by the external force of the user, a specific object, on which the pointer is located, is selected.

16. The method of claim 13, wherein if a pressure less than a specific threshold value is created by a force applied by the user to the slide button, the pointer is moved.

17. The method of claim 13, further comprising:
- checking whether the slide button is located around a boundary of a motion control hole; and
- if the slide button is located around the boundary of the motion control hole, moving continuously the pointer in a direction that corresponds to the location of the slide button.

18. A method of using a slide-type input device, comprising:
- (a) if a slide button is moved in a specific direction by an external force applied by a user, detecting movement location information of the slide button;
- (b) calculating a movement location of the slide button using a location-detection module and calculating whether the slide button is located around a boundary of a motion control hole, based on the detected movement location information;
- (c) calculating a volume change of the slide button depending on whether the button approaches the boundary of the motion control hole;
- (d) calculating a movement location of a pointer displayed on a screen based on the calculated movement location and volume change of the slide button; and
- (e) displaying the pointer moved to the calculated location,
- wherein the location-detection module comprises a connection line coupling part, which has connection lines, to check the movement location of the slide button, and a scale indicator, coupled with the connection line coupling part through a central axis and rotated in the same direction as the connection line coupling part while the slide button is moved, to indicate a scale of a specific interval according to the movement of the slide button, and a restoration part, coupled with the connection line coupling part through the central axis, to return the slide button to an original location due to the elastic force caused by the movement of the slide button.

19. The method of claim 18, further comprising displaying an object where the pointer is located, if the slide button is selected by the user.

20. The method of claim 18, wherein (a) is performed on the basis of a brightness change value of a scale of the location-detection module.

21. The method of claim 18, wherein if the slide button is located around the boundary of the motion control hole for a specific time, the pointer is continuously moved in a direction that corresponds to the location.

22. The method of claim 18, wherein the motion control hole has a circular shape.

23. A medium comprising computer readable instructions implementing the method of claim 13.

24. A medium comprising computer readable instructions implementing the method of claim 18.

25. A slide-type input device comprising:
- a movable slide button; and
- a location-detection module detecting a location-change information according to movement of the movable slide button, wherein the location-detection module comprises:
  - a connection line coupler, which has connection lines, checking the movement of the movable slide button;
  - a restorer, coupled with the connection line coupler through a central line axis, returning the slide button to an original location due to an elastic force;
  - a scale indicator, coupled with the connection line coupler through a central axis and rotated in the same direction as the connection line coupling part while the slide button is moved, indicating a scale of a specific interval according to the movement of the movable slide button; and
  - an optical sensor sensing a brightness change value of the scale according to the movement of the movable slide button to produce a signal corresponding to the sensed brightness change value.

26. A location-detection module detecting a location-change information according to movement of a movable slide button, wherein the location-detection module comprises:
- a connection line coupler, which has connection lines, checking the movement of the movable slide button;
- a scale indicator, coupled with the connection line coupler through a central axis and rotated in the same direction as the connection line coupling part while the slide button is moved, indicating a scale of a specific interval according to the movement of the movable slide button;
- a restorer, coupled with the connection line coupler through a central line axis, returning the slide button to an original location due to the elastic force; and
- an optical sensor sensing a brightness change value of the scale according to the movement of the movable slide button to produce a signal corresponding to the sensed brightness change value.

* * * * *

UNITED STATES PATENT AND TRADEMARK OFFICE
CERTIFICATE OF CORRECTION

PATENT NO. : 7,724,244 B2 Page 1 of 1
APPLICATION NO. : 11/493562
DATED : May 25, 2010
INVENTOR(S) : Dong-kyung Nam et al.

It is certified that error appears in the above-identified patent and that said Letters Patent is hereby corrected as shown below:

Column 12, Line 27 delete "pointer," after "by the".

Signed and Sealed this

Nineteenth Day of October, 2010

David J. Kappos
*Director of the United States Patent and Trademark Office*